US012592100B2

(12) United States Patent
Cordova et al.

(10) Patent No.: US 12,592,100 B2
(45) Date of Patent: Mar. 31, 2026

(54) VEHICLE-BASED DATA OPTIMIZATION

(71) Applicant: PANASONIC CORPORATION OF NORTH AMERICA, Denver, CO (US)

(72) Inventors: Lauren Cordova, Littleton, CO (US); Robert Zimmer, Parker, CO (US)

(73) Assignee: Panasonic Corporation of North America, Newark, NJ (US)

( * ) Notice: Subject to any disclaimer, the term of this patent is extended or adjusted under 35 U.S.C. 154(b) by 83 days.

(21) Appl. No.: 18/471,623

(22) Filed: Sep. 21, 2023

(65) Prior Publication Data

US 2024/0104972 A1 Mar. 28, 2024

Related U.S. Application Data

(60) Provisional application No. 63/410,517, filed on Sep. 27, 2022.

(51) Int. Cl.
*G07C 5/00* (2006.01)

(52) U.S. Cl.
CPC .................................... *G07C 5/008* (2013.01)

(58) Field of Classification Search
None
See application file for complete search history.

(56) References Cited

U.S. PATENT DOCUMENTS

| | | | | |
|---|---|---|---|---|
| 7,434,015 | B2 * | 10/2008 | Zhu ..................... | G06F 12/0866 711/E12.019 |
| 10,868,677 | B2 | 12/2020 | Barrett et al. | |
| 2017/0032589 | A1 | 2/2017 | Zagajac et al. | |
| 2017/0243485 | A1 | 8/2017 | Rubin et al. | |
| 2020/0220737 | A1 | 7/2020 | Ryu et al. | |
| 2021/0215494 | A1 * | 7/2021 | Xia .................... | G01C 21/3691 |

* cited by examiner

*Primary Examiner* — Abdhesh K Jha

(57) ABSTRACT

Methods of and systems for optimizing data storage and processing in a connected vehicle system are provided. For example, the method can include receiving encoded vehicle messages from one or more transmission units and storing each of the encoded vehicle messages. The method can further include decode the stored encoded messages to produce decoded vehicle messages, analyze each of the decoded vehicle messages to identify one or more deduplicated and unique messages, and storing each of the one or more deduplicated and unique messages. The method can further include performing further processing on the one or more deduplicated and unique messages based upon a user request to generate at least one user-requested output. The system can include one or more computing components such as a computer readable medium and at least one processor for implementing the above method.

16 Claims, 7 Drawing Sheets

500

| Message_ID | Record_ID | Tenant | Message_Type | Source_IP | RCVD_Date_UTC | Raw_Data |
|---|---|---|---|---|---|---|
| 0a321a | 1c2314 | DOT1 | BSM | xxx.xx.xx.001 | 09/06/2022 | Message_data1 |
| 0a547b | 2d451a | DOT1 | BSM | xxx.xx.xx.101 | 09/06/2022 | Message_data2 |
| 0a2b67 | 5ad45b | DOT3 | BSM | xxx.xx.xx.243 | 09/07/2022 | Message_data3 |
| 0b873a | 4533a1 | DOT1 | BSM | xxx.xx.xx.953 | 09/07/2022 | Message_data4 |
| 0f681b | 345d5f | DOT1 | BSM | xxx.xx.xx.834 | 09/07/2022 | Message_data5 |
| 05b23c | 355a5b | DOT1 | BSM | xxx.xx.xx.690 | 09/07/2022 | Message_data6 |
| 0c8d1b | 6733b9 | DOT2 | BSM | xxx.xx.xx.396 | 09/07/2022 | Message_data7 |

FIG. 5

VEHICLE-BASED DATA OPTIMIZATION

CROSS-REFERENCE TO RELATED APPLICATION

The present application claims benefit of U.S. Provisional Application No. 63/410,517, filed Sep. 27, 2022, the disclosure of which is hereby incorporated by reference in its entirety for all purposes.

FIELD OF THE INVENTION

The present disclosure relates to the field of vehicle automation and/or assistance and, in particular, to optimization of data received from one or more vehicles.

BACKGROUND

Vehicles today generate a lot of data, and there is increased interest in collecting data from connected vehicles to support various roadway safety, mobility, and other use cases. Connected Vehicle (CV) data is data collected/received from vehicles on the road, including location, speed, and potentially other contextual data elements. In some examples, the additional data can include data such as wiper status, traction control status, etc. depending on the data source.

There are various types of vehicle communication systems. Vehicle-to-everything (V2X) communications includes devices and systems that allow one or more vehicles to communicate with other vehicles (using, for example, vehicle-to-vehicle (V2V) communications), infrastructure (using, for example, vehicle-to-infrastructure (V2I) communications), and/or pedestrians (using, for example, vehicle-to-pedestrian (V2P) communications). Intelligent Transportation Systems (ITS) sometimes utilize V2X systems to manage traffic flow, manage lane occupancy, facilitate toll collection, track freight, provide road condition alerts, and the like. Most ITS applications rely on the situation or cooperative awareness, which is based on periodic and event-driven broadcast of messages such as basic safety messages (BSM) between vehicles and other data collecting/receiving devices.

V2X datasets are specific CV datasets that are standards based to ensure interoperability across vehicle types and jurisdictions. Today, V2X deployments include On-Board Units (OBUs) installed in vehicles that aggregate, transmit, and process V2X data; RoadSide Units (RSUs) to collect V2X data from nearby vehicles and transmit certain data to vehicles; and cloud-based backend processing of V2X data. One of the primary use cases for standards-based V2X communications is real-time safety applications such as in-vehicle safety alerts for other vehicles or intersection states (e.g. red-light violation warning). As such, V2X data is meant to be transmitted at high-frequency, and messages can be sent up to 10× per second per device and message type, leading to high data volumes. According to a 2018 Statista Connected Car Report, 105 million connected cars could generate 20 TB of data per hour, or 150 PB of data per year.

SUMMARY

In at least one example as described herein, a method of optimizing data storage and processing in a connected vehicle system is provided. The method includes receiving, by at least one processor, a plurality of encoded vehicle messages from one or more transmission units; storing, by the at least one processor, each of the encoded vehicle messages on a computer readable medium operably coupled to the processor; decoding, by the at least one processor, the stored encoded messages to produce a plurality of decoded vehicle messages; analyzing, by the at least one processor, each of the plurality of decoded vehicle messages to identify one or more deduplicated and unique messages; storing, by the at least one processor, each of the one or more deduplicated and unique messages on the computer readable medium; and performing, by the at least one processor, further processing on the one or more deduplicated and unique messages based upon a user request to generate at least one user-requested output.

Implementations of the method of optimizing data storage and processing in a connected vehicle system can include one or more of the following features.

In some examples of the method, analyzing each of the plurality of decoded vehicle messages to identify one or more deduplicated and unique messages can include receiving, by the at least one processor, at least one searching criteria included in the user request and filtering, by the at least one processor, the plurality of decoded vehicle messages based upon the at least one searching criteria; to produce a filtered set of encoded messages. In some examples, the at least one searching criteria can include at least one message field identifier for filtering the stored encoded messages based upon the at least one message field identifier. In some examples, the message field identifier can include one or more of a message identifier, a tenant, message type, source address identifier, timestamp information, and message size information.

In some examples of the method, the method can further include assigning, by the at least one processor, an encoded message type to each of the plurality of decoded vehicle messages. In some examples, the method can further include organizing, by the at least one processor, the plurality of decoded vehicle messages based upon the assigned encoded message type. In some examples, the assigned encoded message type can include one or more of safety messages, map data messages, signal phase and timing messages, signal request messages, and signal status messages. In some examples, the method can further include organizing, by the at least one processor, each of the plurality of decoded vehicle messages based upon at least one message field identifier for each of the one or more decoded messages. In some examples, the at least one message field identifier can include one or more of a message identifier, a tenant, and timestamp information.

In some examples of the method, analyzing the plurality of decoded vehicle messages to identify one or more deduplicated and unique messages can include identifying, by the at least one processor, at least a portion of the plurality of decoded vehicle messages received from different transmitting devices that include identical message data and merging, by the at least one processor, the identified at least a portion of the plurality of decoded vehicle messages received from different transmitting devices that include identical message data to generate the one or more deduplicated and unique messages.

In another example, a system for optimizing data storage and processing in a connected vehicle system is provided. The system can include at least one network interface configured to receive a plurality of encoded vehicle messages from one or more roadside transmission units, a computer readable medium operably coupled to the at least one network interface and configured to store each of the encoded vehicle messages, and at least one processor operably coupled to the at least one network interface and the computer readable medium. The at least one processor can be configured to decode the stored encoded messages to produce a plurality of decoded vehicle messages, analyze each of the plurality of decoded vehicle messages to identify one or more deduplicated and unique messages, store each of the one or more deduplicated and unique messages on the computer readable medium, and perform further processing on the one or more deduplicated and unique messages based upon a user request to generate at least one user-requested output.

Implementations of the system for optimizing data storage and processing in a connected vehicle system can include one or more of the following features.

In some examples of the system, the at least one processor can be configured to analyze each of the plurality of decoded vehicle messages to identify one or more deduplicated and unique messages by being further configured to receive at least one searching criteria included in the user request and filter the plurality of decoded vehicle messages based upon the at least one searching criteria; to produce a filtered set of encoded messages. In some examples, the at least one searching criteria can include at least one message field identifier for filtering the stored encoded messages based upon the at least one message field identifier. In some examples, the message field identifier can include one or more of a message identifier, a tenant, message type, source address identifier, timestamp information, and message size information.

In some examples of the system, the at least one processor can be further configured to assign an encoded message type to each of the plurality of decoded vehicle messages. In some examples, the at least one processor can be further configured to organize the plurality of decoded vehicle messages based upon the assigned encoded message type. In some examples, wherein the assigned encoded message type can include one or more of safety messages, map data messages, signal phase and timing messages, signal request messages, and signal status messages. In some examples, the at least one processor can be further configured to organize each of the plurality of decoded vehicle messages based upon at least one message field identifier for each of the one or more decoded messages. In some examples, the at least one message field identifier can include one or more of a message identifier, a tenant, and timestamp information.

In some examples of the system, the at least one processor can be configured to analyze the plurality of decoded vehicle messages to identify one or more deduplicated and unique messages by being further configured to identify at least a portion of the plurality of decoded vehicle messages received from different transmitting devices that include identical message data and merge the identified at least a portion of the plurality of decoded vehicle messages received from different transmitting devices that include identical message data to generate the one or more deduplicated and unique messages.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

FIG. is a sample encoded received message, in accordance with at least one example of the present disclosure.

Figure 6:
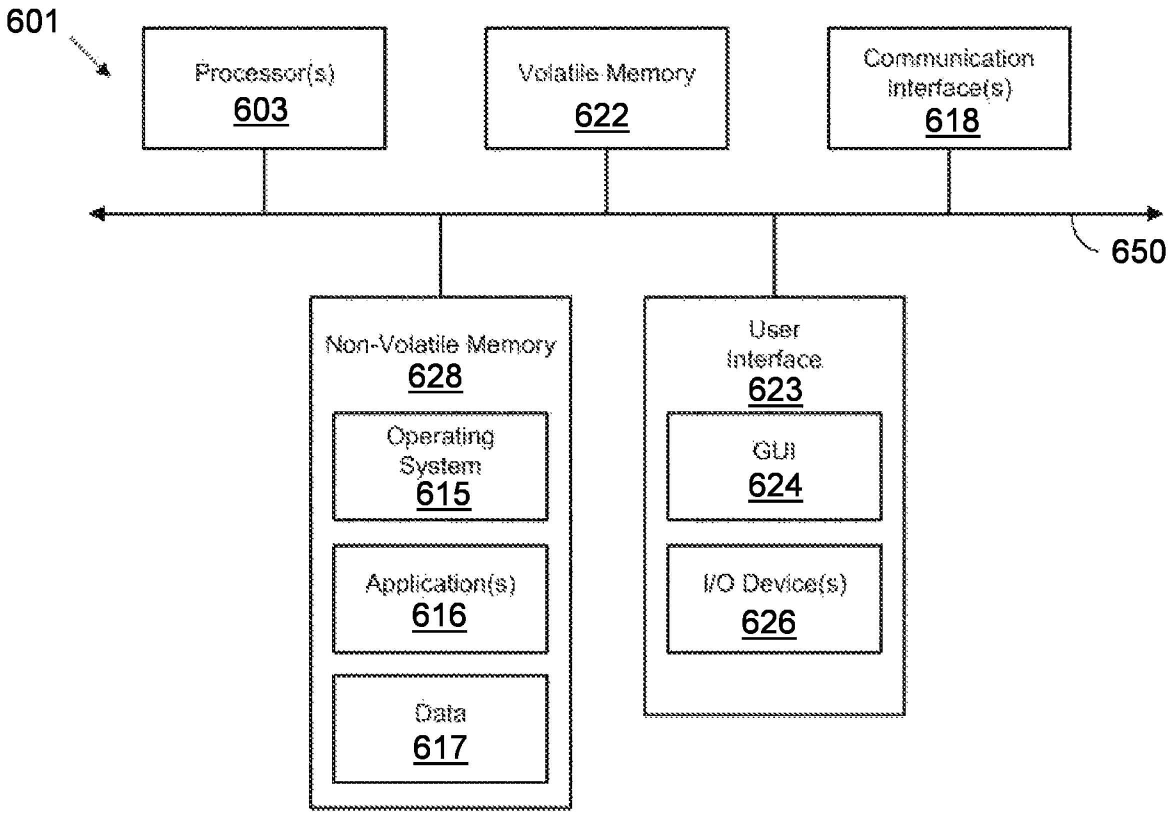

FIG. 6 is a sample computing device configured to implement at least one process as disclosed herein, in accordance with at least one example of the present disclosure.

DETAILED DESCRIPTION

The present disclosure is directed to optimization of collecting and processing V2X data to enable optimal data storage and processing. However, the present disclosure is also directed to supporting the most critical use cases for operations and maintenance of V2X data as well as safety-critical cloud-based applications for departments of transportation users and other roadway operators. Historically, V2X data collectors have been collecting and storing all messages received. Such an approach may be feasible at low volume of V2X deployment or in environments where overlapping device coverage does not exist. However, data management and storage will become increasingly more expensive and difficult to process at scale as automotive manufacturers begin to deploy on-board units (OBUs) in more cars and more departments of transportation deploy roadside units (RSUs) to interact with these equipped vehicles. As more OBUs and RSUs are deployed, data collection systems can exist where device coverage overlaps. In such an example, duplicated messages from multiple devices can be received at a central data processing and storage location (e.g., in a data collection system where multiple RSU coverage areas overlap such that multiple RSUs can receive the same duplicated message from a single OBU). In such an example, processing and storage resources can be wasted at the central data processing and storage location to process and store the duplicated messages. Therefore, optimized architecture of V2X datasets in a way that minimizes storage and processing costs while enabling the desired applications is a critical consideration to support V2X at scale.

The present disclosure is directed to systems and methods of optimizing data storage and processing in a connected vehicle system such as a V2X vehicle system. For example, a computer-implemented method of optimizing data storage and processing in a connected vehicle system can include receiving, by at least one processor, encoded message data from one or more transmission units, the encoded message data generated and transmitted by at least one connected vehicle. The processor can store the received encoded vehicle messages. Once each received message is stored, the processor can decode each of the encoded messages and analyze each of the decoded messages to identify deduplicated and unique messages. For each identified deduplicated and unique message, the processor can store the message and perform additional post-processing on the stored deduplicated and unique messages in response, for example, to a user request for additional information. As such, storage and processing of duplicated messages is eliminated, and overall storage and processing resources are optimized.

Examples of the methods, systems, and processes discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Sample Connected Vehicle

In some examples, a connected vehicle can be configured to collect information related to operation of the vehicle and distribute this information to one or more receiving devices. In certain implementations, a connected vehicle can be configured to transmit a basic safety message (BSM) ten times per second. Nearby receiving devices such as other connected vehicles and roadside equipment such as RSUs receive the messages.

Figure 1:
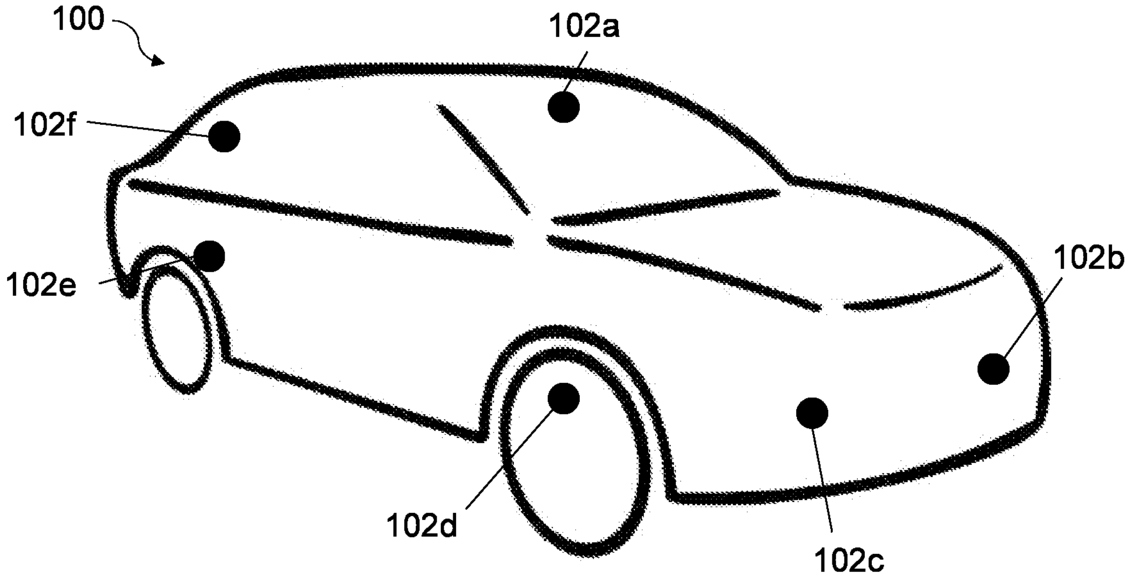
FIG. 1 is a block diagram of a sample connected vehicle, in accordance with at least one example of the present disclosure.

Typically, a BSM can include contextual data about what is happening on a vehicle. The information contained within a typical BSM is based upon information collected from a series of sensors integrated into a connected vehicle. For example, FIG. 1 illustrates a connected vehicle 100. As shown in FIG. 1, the connected vehicle 100 can include a number of sensors 102*a*-102*f*, collectively referred to herein as sensors 102. For example, the connected vehicle 100 can include a lane departure sensor 102*a*, an active park assist sensor 102*b*, a front object sensor 102*c*, a tire pressure sensor 102*d*, a wheel speed sensor 102*e*, and a rear object sensor 102*f*. However, it should be noted that the sensors 102 as shown in FIG. 1 are provided by way of example only. In some examples, a connected vehicle can include fewer or more sensors than those as shown in FIG. 1. For example, a connected vehicle can include one or more of lane departure sensors, night vision sensors, front object cameras, vehicle speed sensors, pedestrian warning sensors, airbag sensors, front object sensors, active park assist sensors, tire pressure sensors, rear object cameras, side curtain sensors, blind spot detection sensors, cross traffic alert sensors, wheel speed sensors, collision sensors, steering angle sensors, adaptive cruise control sensors, automatic brake actuator sensors, and other similar connected vehicle sensors.

Connected Vehicle System and Optimization Process

Figure 2:
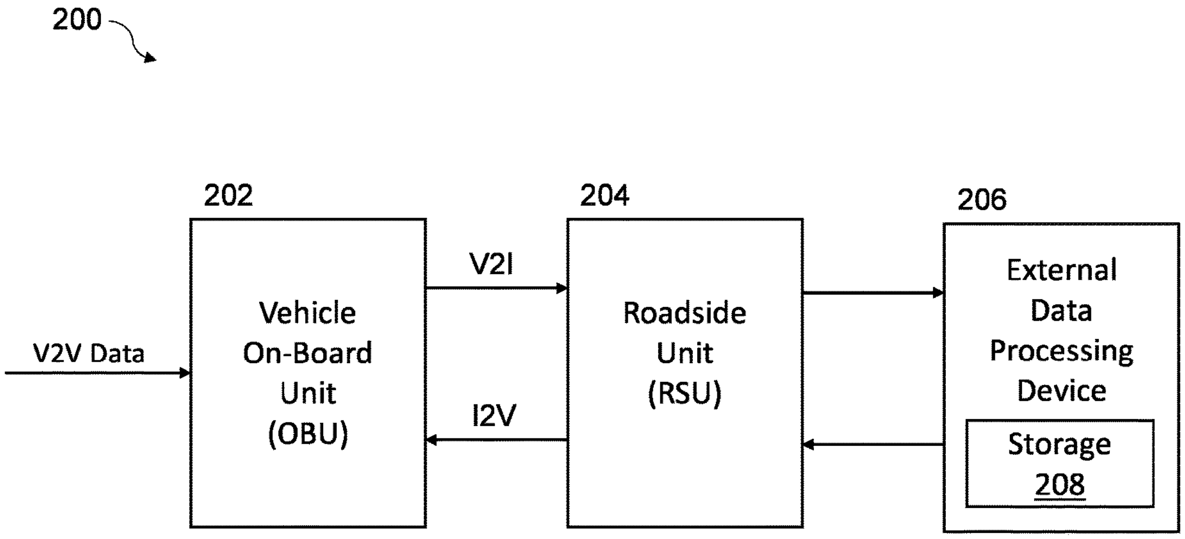
FIG. 2 is a block diagram of a sample connected vehicle system, in accordance with at least one example of the present disclosure.

FIG. 2 illustrates a sample vehicle communication system 200. As shown in FIG. 2, one or more processing devices can be configured to communicate via one or more data communication connections to exchange data therebetween. For example, as shown in FIG. 2, the system 200 can include a vehicle onboard unit 202, a roadside unit 204, and external data processing device 206. As further shown in FIG. 2, the OBU 202 can be configured to receive V2V data from one or more additional vehicles located in close proximity to the OBU 202. The OBU 202 can be further configured to transmit data collected related to the vehicle associated with the OBU 202 to the RSU 204. For example, OBU 202 can be configured to transmit the collected data to the RSU 204 as a vehicle-to-infrastructure (V2I) communication.

As further shown in FIG. 2, the RSU 204 can be configured to receive the V2I communication from the OBU 202. The RSU 204 can be further configured to process the received information and transmit at least a portion of the information to the external data processing device 206. In certain examples, the RSU 204 can be configured to transmit the information as encoded vehicle data. The device 206 can be configured to receive the information from the RSU 204 and store the received information at storage 208. As described herein, the storage 208 can be implemented as a computer-readable medium operably coupled to the external data processing device 206 such that information stored on storage 208 is accessible to the device 206.

As also shown in FIG. 2, the external data processing device 206 can be configured to transmit data to the RSU 204. The RSU 204 can be configured to process the received information and, if applicable, transmit at least a portion of the received information to the OBU 202 as, for example, an infrastructure-to-vehicle (I2V) communication.

It should be noted that, as used herein, V2X communications can include all communication directions and inter-device combinations as described herein. For example, V2X communications can include V2V communications, V2I communications, I2V communications, and other similar inter-device communications associated with a smart vehicle data collection system as described herein.

In such an example system as shown in FIG. 2, data collected by the OBU 202 about the connected vehicle in which the OBU 202 is installed is transmitted to the external data processing device 206 the RBU 204. The device 206 can be configured to analyze the messages and data collected by the OBU 202 to detect any events that are to be communicated back to the OBU 202 such as updated traffic condition information, emergency information, and other similar information. The device 206 is configured to transmit such event information back to the OBU 202 via the RBU 204 as further shown in FIG. 2.

However, as noted above, as the number of connected vehicles continues to increase, so too does the data collected by those connected vehicles, the amount of storage required to store all the collected data, and the amount of processing resources required to analyze all incoming vehicle data. To optimize the processing resources used for analyzing the vehicle data, the present disclosure proposed storing all encoded/raw message and decoding only deduplicated and unique messages based upon specific search criteria to each message type. Such an approach will allow all desired V2X applications and use cases to be supported while optimizing the storage and processing resources used.

In order to implement such a process, raw messages with limited parsed information can be utilized to support desired use cases while optimizing storage requirements. For example, the following TABLE 1 lists a set of fields that can be stored for every raw message received:

TABLE 1

| FIELD | DESCRIPTION |
|---|---|
| Message_ID | A unique identifier per message that is assigned in the data ingestion pipeline. |
| Message_Type | The type of message received. If the message is not a valid message and therefore cannot be assigned a type, this field could be null or include some standardized text value indicating the error. |
| Tenant | Tenant associated with the message. |
| Source_IP | The IP address of the device that received the message (likely the RSU IP address). |
| Landed_UTC | The timestamp that the message was processed by the pipeline and landed at the end point for consumption by any downstream services. This should be available for all messages because it is an artifact of the data pipeline. |
| Received_UTC | The timestamp that the message was received by the device. For example, if the message type was BSM this would be the timestamp the RSU received the BSM. This may not be available from all RSUs, but if possible this should be captured. |
| Created_UTC | The timestamp that the message was created, if available. In order to determine this timestamp, certain fields in the message would need to be parsed. For example, MOY and MILLISECOND on connected intersection (CI) messages can be leveraged to compute the CREATION_UTC. Not all messages may have this field, so for BSMs this field would be null. |
| Message_Size | Some calculation to determine the size or weight of the message. |
| Message_Raw | The raw/encoded message. |

For improving end user features and analysis, analyzing the received raw data prior to decoding and performing initial optimizations can streamline the user experience as well as decrease data storage and usage costs. The messages can be stored and analyzed by message type, with tailored columns based upon message content. The processes as shown in FIGS. 3, 4A, and 4B include various proposed processes for optimizing processing of decoded messages as a high level.

Figure 3:
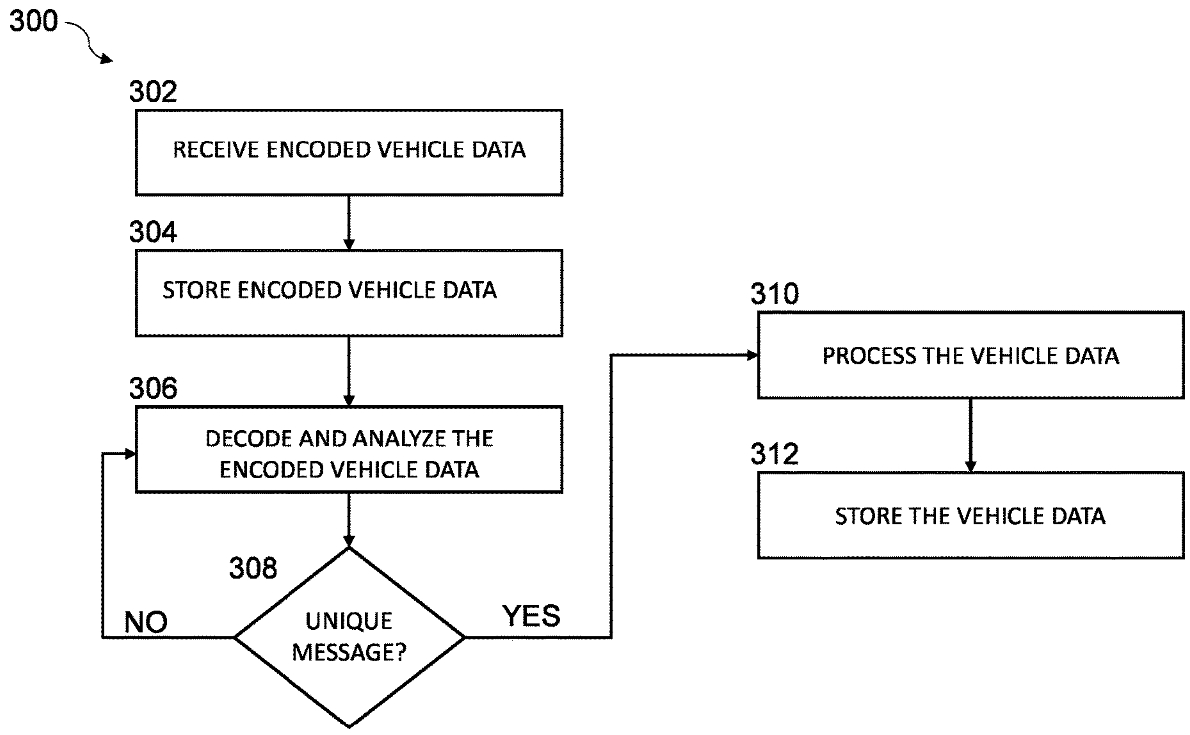
FIG. 3 is a flow diagram illustrating a sample data optimization process, in accordance with at least one example of the present disclosure.
Figure 4A:
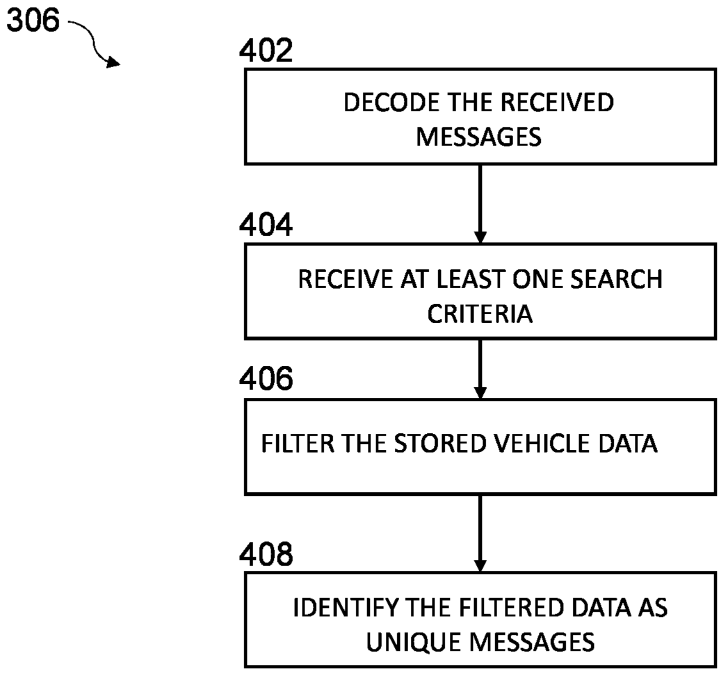
FIG. 4*a* is a flow diagram showing a more detailed process flow for analyzing stored encoded messages, in accordance with at least one example of the present disclosure.
Figure 4B:
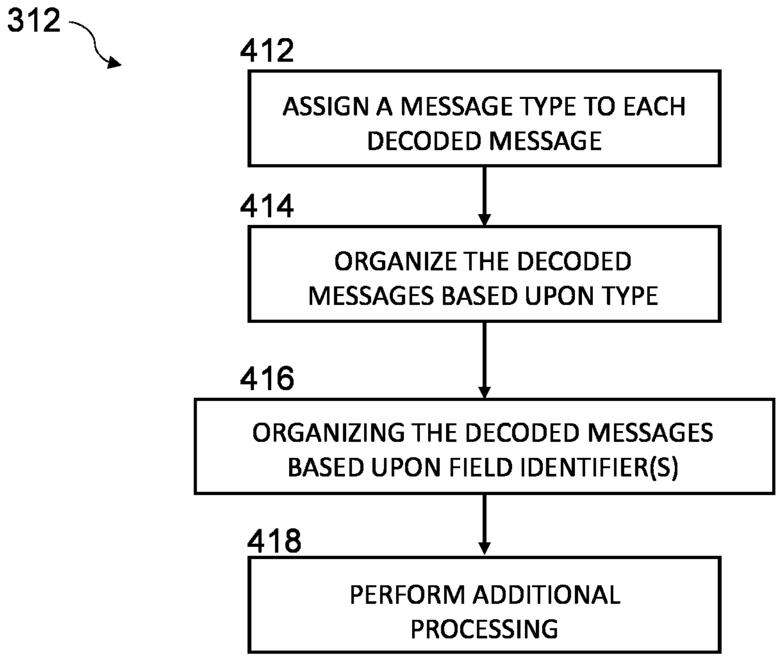
FIG. 4B is a flow diagram showing a more detailed process flow for decoding vehicle messages, in accordance with at least one example of the present disclosure.

FIG. 3 illustrates a process 300 for use in optimizing data storage and processing in a connected vehicle system as described herein. The process 300, including steps 302, 304, 306, 308, 310, and 312, can be implementing by a processing device such as the external data processing device 206 as shown in FIG. 2 and described above.

As shown in FIG. 3, process 300 begins when the processing device receives 302 the encoded vehicle data. For example, as described herein, the encoded vehicle data can be received from an RSU such as RSU 204 as shown in FIG. 2 and described above. FIG. 5 illustrates a sample portion of a data structure 500 configured to store a set of received encoded vehicle data. For example, as shown in FIG. 5, the data structure 500 can include various data such as Message_ID, Record_ID, Tenant, Message_Type, Source_IP, RCVD_Date_UTC, and Raw_Data. In some examples, the Message_ID can be a number generated based upon additional information contained within the message (e.g., an analysis of the hexadecimal value of the Raw_Data field) and assigned to each received message. The Record_ID can be a unique number arbitrarily assigned to each message. As such, multiple messages (having the same Raw_Data) may have the same Message_ID while still having a unique Record_ID. Additionally, the Tenant field can indicate the owner and/or source of the information. For example, the Tenant can be a state department of transportation, a national transportation agency, a vehicle manufacturer, and other similar organizations. The Message_Type can represent what type of message data is contained within the message. For example, message types can include BSMs, map data messages, signal phase and timing messages, signal request messages, signal status messages, and other similar types of messages.

As further shown in data structure 500, the Source_IP field can include an Internet Protocol (IP) address of the transmitting device that the message was received from. For example, the Source_IP can be the IP address of an RSU (e.g., RSU 204 as shown in FIG. 2) that has transmitted the vehicle message to a central data processing and storage system (e.g., external data processing device 206 as shown in FIG. 2). The RCVD_Date_UTC field can include timestamp information related to when the message was received. The Raw_Data field can include the encoded message data (e.g., encoded as hexadecimal data).

As described herein, in the situation where multiple RSUs overlap and can receive and transmit the same connected vehicle data, multiple messages stored in a data structure such as data structure 500 can have the same Raw_Data information. In such an example, storing the raw data for later processing after the data is decoded can reduce processing and storage efficiency as described herein. As such, the processes as shown in FIGS. 3, 4A, and 4B can be utilized to identify redundant information received from multiple RSUs such that only deduplicative and unique decoded message data is processed and stored.

It should be noted that data structure 500 is provided by way of example only. In some examples, the data structure can include additional or fewer data organized, for example, in correspondingly more or less columns. For example, additional timestamp information can be collected, information related to the encoding of the message, system environment information, and other similar information collected from one or more connected vehicles as described herein.

Referring back to FIG. 3, after receiving 302 the encoded vehicle data, the processing device can store 304 the encoded vehicle data. For example, the processing device can store 304 the encoded vehicle data on a computer-readable medium operably connected to the processing device such as storage 208 as shown in FIG. 2 and described above. As further shown in FIG. 3, the processing device can decode and analyze 306 the encoded vehicle data to determine one or more characteristics of the encoded vehicle data such as, for example, message type. For example, the processing device can parse the stored information for the encoded data, decode and analyze 306 the message type data field for the stored vehicle data and deduplicate messages by, for example, removing particular message data and fields such as Message_ID and/or Source_IP as noted above such that each message is only reported once. Based upon the resulting analysis 306 of the encoded vehicle data, the processing device can identify one or more deduplicative and unique messages as included in the decoded vehicle data as described herein. More specifically, as further shown in FIG. 3, the processing device can determine 308 whether each message is deduplicative and unique. If the processor determines that a message is not deduplicative and unique, the processor can continue to decode and analyze 306 the stored information as new encoded vehicle data is received. Conversely, if the processing device does determine 308 that the message is deduplicative and unique, the processing device perform additional processing 310. For example, the processing device can be configured to further process 310 the vehicle data to determine any changes between messages as determined by message type. The processing device can further store 312 the vehicle data for additional analysis at, for example, a later time.

In some examples, unique decoded messages may include a start and end time, with the end time being updated as additional messages are received with the same parameters. In some examples, the decoded messages can include data fields similar to those as included in the following Table 2:

TABLE 2

| FIELD | DESCRIPTION |
|---|---|
| Message_ID | A unique identifier per message that is assigned in the data ingestion pipeline. |
| Tenant | Tenant associated with the message. |
| TMSTP_UTC | The farthest upstream timestamp for the data. |
| Message-Specific Fields | Additional fields that will vary based upon message type. |

It should be noted that the process 300 as shown in FIG. 3 is provided by way of example only. Various steps as included in the process 300 can be altered based upon implementation. For example, FIGS. 4A and 4B illustrate alternate implementations for various steps as included in the process 300.

As shown in FIG. 4A, the process step 306 directed to decoding and analyzing the encoded vehicle data can include various additional process steps. For example, the processing device can be configured to decode 402 the stored encoded messages using, for example, a standard decoding scheme. For example, a standard encoding/decoding scheme as defined by the J2735 standard can be used for encoding and decoding vehicle data as described herein. After and/or prior to decoding 402 the message, the processing device can receive 404 at least one search criteria for analyzing/processing the vehicle data. In certain implementations, the search criteria can include, for example, at least one message field identifier for filtering the decoded vehicle data. As described herein, the field identifier can identify one or more fields as shown, for example, in TABLE 1 above.

As further shown in FIG. 4A, the processing device can be further configured to filter 406 the decoded vehicle data based upon the at least one search criteria. The processing device can be further configured to identify the 408 the filtered data as including one or more deduplicative and unique messages.

Similarly, additional process steps as shown in FIG. 3 and included in process 300 can include additional steps. For example, FIG. 4B illustrates an example process for implementing step 310 as shown in process 300 directed to processing the decoded unique vehicle data. As shown in FIG. 4B, the processing device can be configured to assign 412 a message type to each decoded message. For example, the message type can include safety messages, map data messages, signal phase and timing messages, signal request messages, signal status messages, and other similar message types. Based upon the assigned message type, the processing device can be further configured to organize 414 the decoded vehicle message data. In some examples, the processor can be further configured to organize 416 the decoded vehicle data even further based upon at least one message field identifier associated with the decoded data. For example, at least one message field identifier can include one or more fields as shown in TABLE 2 above. After the organizing 414 and/or 416, the processing device can be further configured to perform 418 additional processing of the organized decoded vehicle data.

The systems and processes as described hereinabove are directed to supporting real-time applications between edge devices (such as RSUs) and vehicles (such as OBUs) as described herein. The processes as shown in FIGS. 3, 4A, and 4B are directed to optimizing data processing and storage requirements in a connected vehicle system where all encoded/raw messages as ingested for further processing to maximize value and cost, both financially and computationally.

Sample Computing System

FIG. 6 depicts a block diagram of a computing device 601 useful for practicing the computing and/or processing devices as described herein and implementing the processes as shown, for example, in FIGS. 3, 4A, and 4B and described above. The computing device 601 includes one or more processors 603, volatile memory 622 (e.g., random access memory (RAM)), non-volatile memory 628, user interface (UI) 623, one or more communications interfaces 618, and a communications bus 650. The computing device 601 may also be referred to as a computer or a computer system.

The non-volatile memory 628 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 623 can include a graphical user interface (GUI) 624 (e.g., a touchscreen, a display, etc.) and one or more input/output (I/O) devices 626 (e.g., a mouse, a keyboard, a microphone, one or more speakers, one or more cameras, one or more biometric scanners, one or more environmental sensors, and one or more accelerometers, etc.).

The non-volatile memory 628 stores an operating system 615, one or more applications 616, and data 617 such that, for example, computer instructions of the operating system 615 and/or the applications 616 are executed by processor(s) 603 out of the volatile memory 622. In some examples, the volatile memory 622 can include one or more types of RAM and/or a cache memory that can offer a faster response time than a main memory. Data can be entered using an input device of the GUI 624 or received from the I/O device(s) 626. Various elements of the computer 601 can communicate via the communications bus 650.

The illustrated computing device 601 is shown merely as an example client device or server and can be implemented by any computing or processing environment with any type of machine or set of machines that can have suitable hardware and/or software capable of operating as described herein.

The processor(s) 603 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 603 can be analog, digital or mixed. In some examples, the processor 603 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The communications interfaces 618 can include one or more interfaces to enable the computing device 601 to access a computer network such as a LAN, a WAN, a Personal Area Network (PAN), or the Internet through a variety of wired and/or wireless connections, including cellular connections.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A method of optimizing data storage and processing in a connected vehicle system, the method comprising:

receiving, by at least one processor of an external data processing device, a plurality of encoded vehicle messages from one or more transmission units operably connected to the external data processing device;

storing, by the at least one processor, each of the encoded vehicle messages on a computer readable medium operably coupled to the processor;

decoding, by the at least one processor, the stored encoded messages to produce a plurality of decoded vehicle messages;

analyzing, by the at least one processor, each of the plurality of decoded vehicle messages to identify one or more deduplicated and unique messages, wherein the analyzing comprises:

receiving, by the at least one processor, at least one searching criteria included in a user request received from at least one of the one or more transmission units, the at least one searching criteria comprising at least one message field identifier for filtering the stored encoded messages based upon the at least one message field identifier, and filtering, by the at least one processor, the plurality of decoded vehicle messages based upon the at least one searching criteria, to produce a filtered set of encoded messages;

storing, by the at least one processor, each of the one or more deduplicated and unique messages on the computer readable medium;

performing, by the at least one processor, further processing on the one or more deduplicated and unique messages based upon the user request to generate at least one user-requested output; and transmitting, by the at least one processor, the generated output from the external data processing device to the at least one of the one or more transmission units associated with the received user request.

2. The method of claim 1, wherein the message field identifier comprises one or more of a message identifier, a tenant, message type, source address identifier, timestamp information, and message size information.

3. The method of claim 1, further comprising assigning, by the at least one processor, an encoded message type to each of the plurality of decoded vehicle messages.

4. The method of claim 3, further comprising organizing, by the at least one processor, the plurality of decoded vehicle messages based upon the assigned encoded message type.

5. The method of claim 3, wherein the assigned encoded message type comprises one or more of safety messages, map data messages, signal phase and timing messages, signal request messages, and signal status messages.

6. The method of claim 3, further comprising organizing, by the at least one processor, each of the plurality of decoded vehicle messages based upon at least one message field identifier for each of the one or more decoded messages.

7. The method of claim 6, wherein the at least one message field identifier comprises one or more of a message identifier, a tenant, and timestamp information.

8. The method of claim 1, wherein analyzing the plurality of decoded vehicle messages to identify one or more deduplicated and unique messages comprises:

identifying, by the at least one processor, at least a portion of the plurality of decoded vehicle messages received from different transmission units that include identical message data; and merging, by the at least one processor, the identified at least a portion of the plurality of decoded vehicle messages received from different transmission units that include identical message data to generate the one or more deduplicated and unique messages.

9. A system for optimizing data storage and processing in a connected vehicle system, the system comprising:

at least one network interface configured to receive a plurality of encoded vehicle messages from one or more roadside transmission units operable connected to the at least one network interface;

a computer readable medium operably coupled to the at least one network interface and configured to store each of the encoded vehicle messages; and at least one processor operably coupled to the at least one network interface and the computer readable medium, the at least one processor being configured to:

decode the stored encoded messages to produce a plurality of decoded vehicle messages, analyze each of the plurality of decoded vehicle messages to identify one or more deduplicated and unique messages, wherein the at least one processor is configured to analyze each of the plurality of decoded vehicle messages to identify one or more deduplicated and unique messages by being further configured to:

receive at least one searching criteria included in the a user request received from at least one of the one or more transmission units, the at least one searching criteria comprising at least one message field identifier for filtering the stored encoded messages based upon the at least one message field identifier, and filter the plurality of decoded vehicle messages based upon the at least one searching criteria, to produce a filtered set of encoded messages, store each of the one or more deduplicated and unique messages on the computer readable medium, perform further processing on the one or more deduplicated and unique messages based upon the user request to generate at least one user-requested output, and transmit the generated output from the at least one network interface to the at least one of the one or more transmission units associated with the received user request.

10. The system of claim 9, wherein the message field identifier comprises one or more of a message identifier, a tenant, message type, source address identifier, timestamp information, and message size information.

11. The system of claim 9, the at least one processor being further configured to assign an encoded message type to each of the plurality of decoded vehicle messages.

12. The system of claim 11, the at least one processor being further configured to organize the plurality of decoded vehicle messages based upon the assigned encoded message type.

13. The system of claim 11, wherein the assigned encoded message type comprises one or more of safety messages, map data messages, signal phase and timing messages, signal request messages, and signal status messages.

14. The system of claim 11, the at least one processor being further configured to organize each of the plurality of decoded vehicle messages based upon at least one message field identifier for each of the one or more decoded messages.

15. The system of claim 14, wherein the at least one message field identifier comprises one or more of a message identifier, a tenant, and timestamp information.

16. The system of claim 9, wherein the at least one processor is configured to analyze the plurality of decoded vehicle messages to identify one or more deduplicated and unique messages by being further configured to:

identify at least a portion of the plurality of decoded vehicle messages received from different transmission units that include identical message data; and merge the identified at least a portion of the plurality of decoded vehicle messages received from different transmission units that include identical message data to generate the one or more deduplicated and unique messages.

* * * * *